United States Patent
Yu

(10) Patent No.: US 11,848,589 B2
(45) Date of Patent: Dec. 19, 2023

(54) SYSTEM AND METHOD FOR FORMING A HAIRPIN FOR MOTORS

(71) Applicants: HYUNDAI MOTOR COMPANY, Seoul (KR); KIA CORPORATION, Seoul (KR)

(72) Inventor: Jiwon Yu, Ulsan (KR)

(73) Assignees: Kia Corporation, Seoul (KR); Hyundai Motor Company, Seoul (KR)

( * ) Notice: Subject to any disclaimer, the term of this patent is extended or adjusted under 35 U.S.C. 154(b) by 25 days.

(21) Appl. No.: 17/405,418

(22) Filed: Aug. 18, 2021

(65) Prior Publication Data
US 2022/0103048 A1    Mar. 31, 2022

(30) Foreign Application Priority Data
Sep. 29, 2020   (KR) .................. 10-2020-0126728

(51) Int. Cl.
*H02K 15/04*   (2006.01)
(52) U.S. Cl.
CPC .............................. *H02K 15/0421* (2013.01)
(58) Field of Classification Search
CPC .................................................. H02K 15/0421
See application file for complete search history.

(56) References Cited

U.S. PATENT DOCUMENTS

2019/0109523 A1*   4/2019   Miyazaki ............... H02K 15/04
2021/0184548 A1    6/2021   Kim et al.

FOREIGN PATENT DOCUMENTS

GB          1496445 A   * 12/1977  .............. B21F 1/00
KR     20210075530 A      6/2021

* cited by examiner

*Primary Examiner* — Livius R. Cazan
(74) *Attorney, Agent, or Firm* — LEMPIA SUMMERFIELD KATZ LLC

(57) ABSTRACT

A system and method are provided for forming a head portion and a leg portion of a hairpin applied to a hairpin type drive motor. The system includes: an unwinder unit configured to unwind a material coil wound around a bobbin and flatten the material coil by a plurality of flattening rollers; a feeding unit configured to receive the material coil from the unwinder unit and cut the received material coil to a preset length; and a forming unit including a mold device having a plurality of forming blocks and a pair of forming roller units. The plurality of forming blocks are configured to process the material coil supplied from the feeding unit. The forming unit is configured to form the material coil by the plurality of forming blocks and the pair of forming roller units through a driving device connected to the mold device.

13 Claims, 11 Drawing Sheets

SYSTEM AND METHOD FOR FORMING A HAIRPIN FOR MOTORS

CROSS-REFERENCE TO RELATED APPLICATION

This application claims priority to and the benefit of Korean Patent Application No. 10-2020-0126728 filed in the Korean Intellectual Property Office on Sep. 29, 2020, the entire contents of which are incorporated herein by reference.

BACKGROUND

(a) Field of the Disclosure

The present disclosure relates to a system and method for forming a hairpin.

(b) Description of the Related Art

Recently, a method for improving the output of a motor has been actively researched and developed to improve performance of electric vehicles.

In general, the output of the motor is known to be proportional to the number of turns of a stator coil wound on a stator core. Accordingly, in order to improve the output without increasing the size of the motor, a method of increasing the space factor of the stator coil wound on the stator core may be considered.

As part of the above-described method, instead of using a circular coil having a circular cross-section, a method of winding using a flat coil having a square cross-section type has been researched.

However, in the case of flat coils, there are relative difficulties in winding coils compared to circular coils.

Therefore, as a method of facilitating winding in a flat coil, a type of motor (hereinafter called a hairpin drive motor) has been proposed, in which a plurality of separated hairpin type stator coils (hereinafter referred to as hairpins) are inserted into the stator core. Then respective hairpins are welded to form a coil winding part.

The hairpin drive motor forms a coil winding of the stator core by engaging a hairpin formed in a generally U shape into each slot of the stator core and then welding the hairpins.

Here, the process of forming the hairpin may be a computer numerical control (CNC) forming method. The CNC forming method has the advantage of being able to cope with multiple types of products because several types of hairpins may be handled by one hairpin drive motor.

However, the CNC forming method according to the conventional art is rather slow because the production speed of one hairpin generally requires about 6 seconds. Such a slow production speed may be a critical drawback when the hairpin drive motor requires a very large number of hairpins.

The above information disclosed in this Background section is only to enhance understanding of the background of the present disclosure. Therefore, the Background section may contain information that does not form the prior art that is already known to a person having ordinary skill in the art.

SUMMARY

A system for forming a head portion and a leg portion of a hairpin applied to a hairpin type drive motor may include an unwinder unit configured to unwind a material coil wound around a bobbin and flatten the material coil by a plurality of flattening rollers. The system may further include a feeding unit configured to receive the material coil from the unwinder unit and cut the received material coil to a preset length. The system may further include a forming unit including a mold device having a plurality of forming blocks and a pair of forming roller units. The plurality of forming blocks may be configured to process the material coil supplied from the feeding unit. The forming unit may be configured to form the material coil by the plurality of forming blocks and the pair of forming roller units through a driving device connected to the mold device.

The unwinder unit may include: a bobbin loading portion configured to load the bobbin and rotate by a motor; an unwinder roller that is connected to the bobbin loading portion through a link arm operated by a first cylinder, movable by the link arm and the first cylinder to contact the material coil, and configured to unwind the material coil; a plurality of guide bars disposed at respective corners of the bobbin loading portion and configured to guide the material coil unwound from the bobbin; and a plurality of flattening rollers configured to flatten the material coil supplied from the unwinder roller.

The feeding unit may include a plurality of feeding rollers configured to transfer the material coil supplied from the unwinder unit and a cutter configured to cut the material coil to a preset length while changing a position along a supply direction of the material coil.

The driving device may include first, second, third, and fourth servo motors mounted on a first frame. The first to third servo-motors may be configured to vertically operate and the fourth servo-motor may be configured to horizontally operate. The mold device may include a first forming block configured to vertically operate by the first servo-motor, a second forming block configured to primarily form the head portion by being combined with the first forming block, and a third forming block configured to horizontally operate by the fourth servo-motor to secondarily form the head portion by being combined with the first forming block. The mold device is provided in a plural quantity through a second frame rotatable with respect to the first frame.

The mold device may further include a plurality of clampers disposed along a horizontal direction to position the material coil to a preset position. The first forming block may be disposed at a position corresponding to a central portion of the material coil. The first forming block may be configured to form the head portion by an upper forming surface and a forming groove by moving down by the first servo-motor and moving up by a first spring connected to an engagement bracket. The second forming block may be disposed at a lower side of the first forming block and may include a lower forming surface corresponding to the upper forming surface. The third forming block may include a forming protrusion configured to push the primarily formed head portion toward the forming groove of the first forming block. The pair of forming roller units may be disposed adjacent to both sides of the first to third forming blocks and configured to form the leg portion while moving along both slanted surfaces of the second forming block.

The clamper may be formed with an opening to receive and hold the material coil.

The first forming block may include an upper forming surface formed as a recess that is concave upward at a lower side surface of the first forming block. The first forming block may include a forming groove that is formed on a surface of the first forming block that is stepped with respect to the upper forming surface, connected to the upper forming surface, and formed to set an angle between the head portion and the leg portion of the hairpin.

The second forming block may include an upper surface forming a lower forming surface that is formed convexly upward and side surfaces, each of which is formed as a slanted surface and connected to the lower forming surface.

The third forming block may include a forming protrusion protruding in a shape corresponding to a curved shape of the head portion and a bent region of the leg portion.

Each of the pair of forming roller units may include: a mounting bracket disposed at either side of the first to third forming blocks, elastically supported by a second spring, and connected to either of the second servo-motor and the third servo-motor, a rotation link hinge-engaged with the mounting bracket; a lower roller mounted on a lower portion of the rotation link and configured to form the leg portion by pressurizing the material coil against the second forming block while descending along a side surface of the second forming block; an upper roller mounted on an upper portion of the rotation link and configured to pressurize the lower roller toward the second forming block through a lever while descending along a guide plate mounted on the engagement bracket; and a pressurizing bar mounted on the mounting bracket through a third spring, and configured to push the upper roller by the elastic force of the third spring.

The forming unit may further include a sensing device disposed behind the clamper based on a supply direction of the material coil and configured to sense a position of the material coil. The sensing device may include a beam sensor configured to sense the material coil, a stopper disposed at a preset position of the mold device depending on a type of the hairpin, and a sensor driving portion mounted on the first frame and configured to position the beam sensor by using the stopper.

The system may further include a transfer unit disposed at a position corresponding to a plurality of forming blocks and configured to remove the hairpin from the forming unit by a guide pin and load the hairpin on a guide rail while moving back and forth with respect to the formed hairpin.

A method for forming a hairpin may include: unwinding a material coil wound around a bobbin by an unwinder unit; flattening the material coil supplied from the unwinder unit by flattening rollers; cutting the material coil supplied from the flattening rollers to a preset length by a feeding unit; and forming the hairpin having a head portion and a leg portion by press-molding the material coil of the preset length supplied from the feeding unit by a plurality of forming blocks.

The unwinding of the material coil may include: loading the bobbin on a bobbin loading portion; releasing strands of the material coil by contacting an unwinder roller to the material coil wound around the bobbin while rotating the bobbin by an operation of a motor connected to the bobbin loading portion; and discharging the unwound material coil from the bobbin loading portion while being guided by guide bars disposed at respective corners of the bobbin loading portion.

In the cutting of the material coil, the preset length may be varied by controlling a horizontal position of a cutter of the feeding unit, depending on a specification of the hairpin to be formed.

The forming of the hairpin having a head portion and a leg portion may include: positioning a mold device corresponding to the hairpin to be formed to a home position; loading the material coil by a plurality of clampers of the mold device; primarily forming the head portion between an upper forming surface of the first forming block and a lower forming surface of the second forming block by lowering the first forming block while the material coil is disposed between the first forming block and the second forming block; forming the leg portion between a pair of forming roller units and both slant surfaces of the second forming block; and secondarily forming the head portion between a forming groove formed in the first forming block and a forming protrusion formed in the third forming block after raising the first forming block by a preset distance.

The forming of the hairpin having a head portion and a leg portion may further include detecting a home positioning of the material coil by a sensing device when the material coil cut into the preset length is supplied to the forming unit.

The method may further include, after the forming of the hairpin, moving a guide pin of a transfer unit toward the hairpin seated on a second forming block after finishing the forming, operating a third forming block to push the hairpin toward the guide pin by a forming protrusion of third forming block, and loading the hairpin on the guide pin to a guide rail that is arranged in a slanted way.

According to a system and method for forming a hairpin according to an embodiment, since the mold device may be automatically changed depending on the types of the hairpin to be formed, multiple types of hairpins may be formed by a single equipment, thereby reducing equipment investment cost and an area occupied by the equipment.

In addition, according to a system and method for forming a hairpin according to an embodiment, in comparison with a conventional CNC forming method or press-mold method, the forming method is simplified, the forming time may be shortened, and productivity may be improved.

Other effects that may be obtained or are predicted by an embodiment are explicitly or implicitly described in a detailed description of the present disclosure. In other words, various effects that are predicted according to an embodiment are described in the following detailed description.

DETAILED DESCRIPTION OF THE EMBODIMENTS

Figure 1:
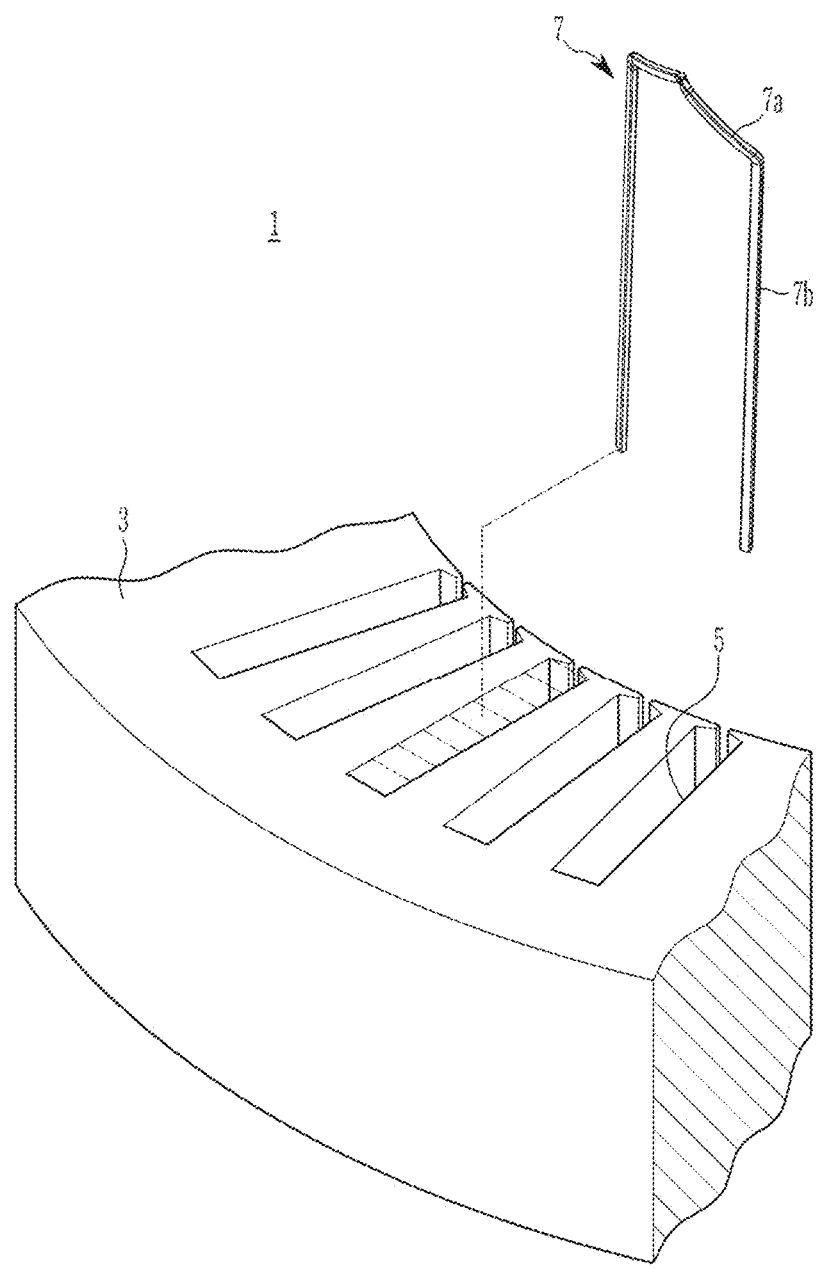
FIG. 1 schematically illustrates a hairpin winding type stator structure of a drive motor applied to an embodiment.

The present disclosure is described more fully hereinafter with reference to the accompanying drawings, in which embodiments of the disclosure are shown. As those having ordinary skill in the art would realize, the described embodiments may be modified in various different ways, all without departing from the spirit or scope of the present disclosure.

In order to clarify the present disclosure, parts that are not related to the description have been omitted in order to avoid obscuring the subject matter of the present disclosure. The same elements or equivalent elements are referred to with the same reference numerals throughout the specification.

In the following description, dividing names of components into 'first', 'second' and the like is done to divide or distinguish the components because the names of the components are the same as each other, and an order thereof is not particularly limited.

FIG. 1 schematically illustrates a hairpin winding type stator structure of a drive motor applied to an embodiment.

Referring to FIG. 1, the hairpin winding type stator of a drive motor applied to an embodiment may be applied to a drive motor for a hybrid electric vehicle and/or an electric vehicle as an environment-friendly vehicle that obtains driving torque by electrical energy.

For example, the drive motor may be a permanent magnet synchronous motor (PMSM).

The drive motor includes a stator 1, a rotor (not shown) disposed in the stator 1 with a predetermined air gap, and a plurality of permanent magnets (not shown) installed in the rotor.

The stator 1 includes a stator core 3 in which a number of electrical steel sheets are stacked (not shown), and hairpins 7 are wound through a plurality of slots 5 in the stator core 3.

In addition, the rotor includes a rotor core (not shown) in which a number of electrical steel sheets are stacked in an axial direction, and the permanent magnet is inserted into the insertion holes provided in the rotor core in a buried manner.

Here, the drive motor may be applied to an inner-rotor type synchronous motor where the rotor is disposed interior to the stator 1, or to an outer-rotor type synchronous motor where the rotor is disposed exterior to the stator 1.

Each hairpin 7 is a flat coil. For example, the hairpin 7 has a pair of leg portions 7b on both sides of a head portion 7a of the central portion, is formed generally in a U shape or V shape and has a flat cross-section.

The hairpins 7 are inserted into a predetermined layer of the slot 5 (indicated as a single-dot chain line in the drawing) in the stator core 3. Ends of a pair of leg portions 7a protrude exteriorly from the slot 5 and the protruded portions are welded to form electrically connected coil winding.

In the above description, an embodiment has been described as being applied to a hairpin winding type stator in a drive motor employed in an environment-friendly vehicle, but the scope of the present disclosure should not necessarily be understood to be limited thereto. It may be understood that the technical idea of the present disclosure may be applied to a drive motor having a hairpin type stator of various types and uses.

Figure 2:
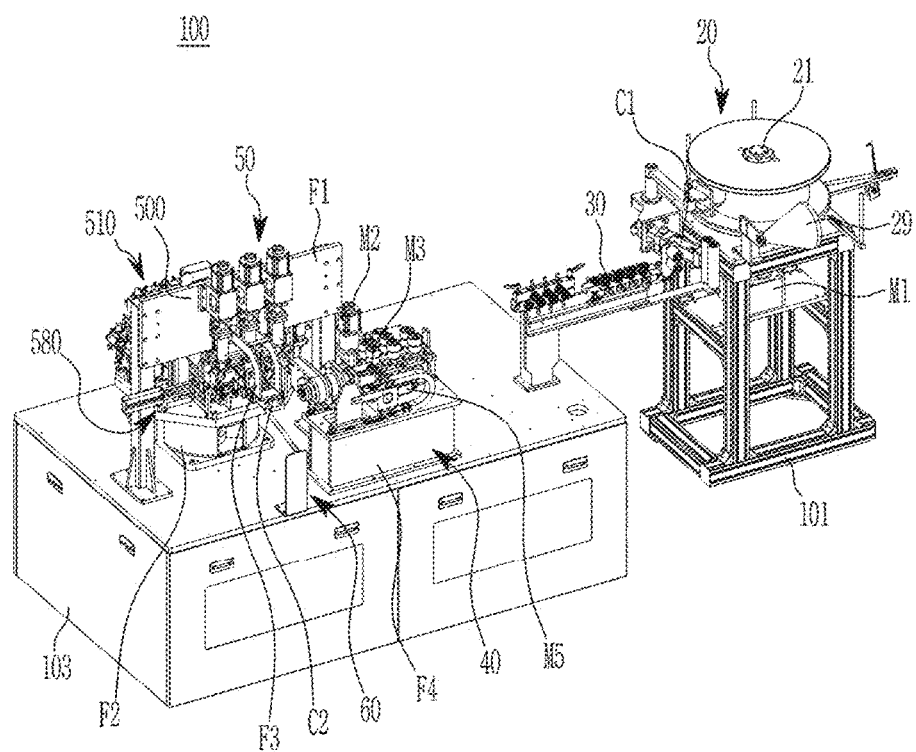
FIG. 2 is an entire schematic diagram of a system for forming a hairpin according to an embodiment.
Figure 3:
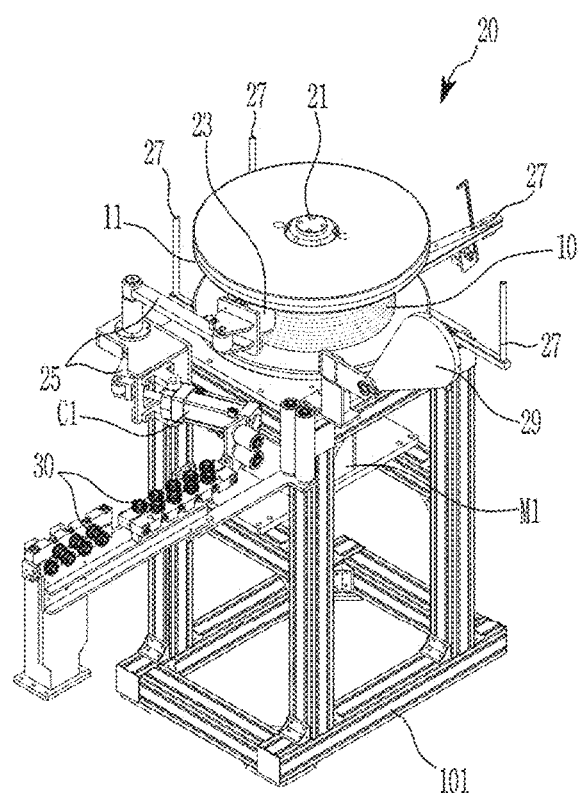
FIG. 3 is a schematic diagram of an unwinder unit applied to a system for forming a hairpin according to an embodiment.

FIG. 2 is an entire schematic diagram of a system for forming a hairpin according to an embodiment. FIG. 3 is a schematic diagram of an unwinder unit applied to a system for forming a hairpin according to an embodiment.

Referring to FIG. 2, the system 100 for forming a hairpin according to an embodiment may be applied to a forming system for forming the hairpins 7 in the process of assembling the drive motor having the hairpins 7.

For such a purpose, the system 100 for forming a hairpin according to an embodiment includes an unwinder unit 20, a feeding unit 40, a forming unit 50, and a transfer unit 60.

The system 100 for forming a hairpin according to an embodiment is installed on first and second base frames 101 and 103. On the first and second base frames 101 and 103, the unwinder unit 20, the feeding unit 40, and the forming unit 50 are sequentially configured along a forward and backward direction.

Here, the unwinder unit 20 side is called a front and the forming unit 50 side is called a rear. A portion disposed upward or above with respect to the forward and backward direction is called an upper portion, an upper end, an upper surface, and an upper end portion.

A portion disposed downward or below with respect to the forward and backward direction is called a lower portion, a lower end, a lower surface, and a lower end portion.

In addition, the forward and backward direction and the left and right direction may be referred to as a horizontal direction and an up-down direction may be called a vertical direction.

Referring to FIG. 3, in an embodiment, the unwinder unit 20 includes a bobbin loading portion 21 in which a bobbin 11 wound with a material coil 10 is seated.

The bobbin loading portion 21 is installed on the first base frame 101 and is configured to rotate the bobbin 11 seated in an upper portion by the first motor M1.

The unwinder unit 20 is configured to unwind the material coil 10 wound around the bobbin 11 and flatten the material coil 10.

The material coil 10 wound around the bobbin 11 is unwound by an unwinder roller 23. The unwinder roller 23 is connected to the bobbin loading portion 21 through a link arm 25 operated by a first cylinder C1 and may be moved in position through the link arm 25 and the first cylinder C1 to contact the material coil 10 wound around the bobbin 11.

In other words, the bobbin 11 is rotated by the bobbin loading portion 21 and the material coil 10 wound around the bobbin 11 is unwound by the unwinder roller 23. Then, the material coil 10 unwound from the bobbin 11 is discharged from the bobbin loading portion 21 and supplied to a supply portion 29, while being supported by guide bars 27 disposed at respective corners of the bobbin loading portion 21.

A plurality of flattening rollers 30 are disposed at a rear of the supply portion 29.

The flattening rollers 30 are disposed in line with the supply portion 29 to flatten the material coil 10. The material coil 10 may be given straightness in vertical and horizontal directions.

The flattening rollers 30 are installed between the first base frame 101 and the second base frame 103.

In an embodiment, it has been described that the first base frame 101 and the second base frame 103 are separated as an example. However, it may be understood that the first base frame 101 and the second base frame 103 may be integrally formed.

The feeding unit 40 is disposed at a rear of the flattening rollers 30 to receive the material coil 10 from the unwinder unit 20.

Figure 4:
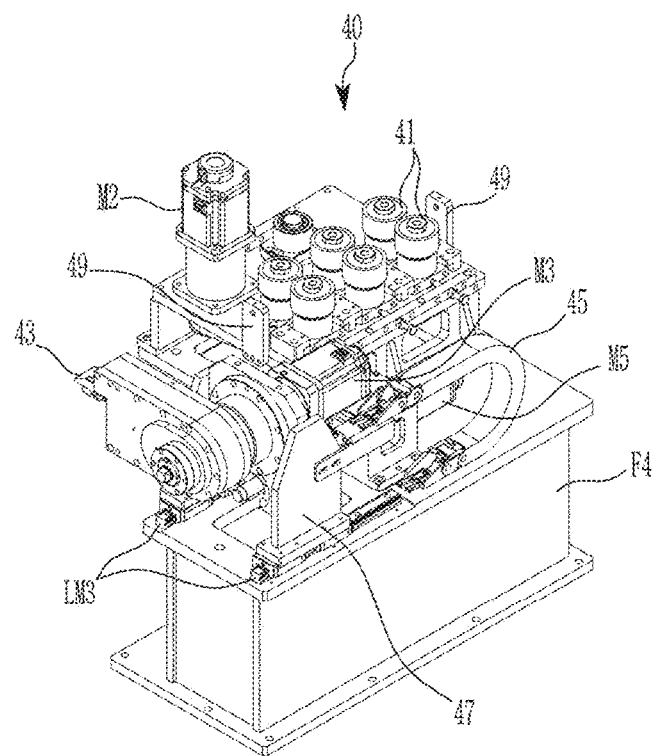
FIG. 4 is a schematic diagram of a feeding unit applied to a system for forming a hairpin according to an embodiment.

FIG. 4 is a schematic diagram of a feeding unit applied to a system for forming a hairpin according to an embodiment.

Referring to FIG. 4, in an embodiment, the feeding unit 40 cuts the material coil 10 flattened by the flattening rollers 30 to a preset length, and then transfers the cut coil portion to the forming unit 50 along a preset path.

The feeding unit 40 is mounted on a fourth frame F4 fixed to an upper surface of the second base frame 103.

The feeding unit 40 transfers the material coil 10 through a plurality of feeding rollers 41.

The feeding rollers 41 are given driving torque by a second motor M2.

At this time, a supporting bracket 49, which the material coil passes through and is supported by, is formed at front and rear of the feeding rollers 41, respectively.

In addition, a cutter 43 is formed at the rear of the feeding roller 41. The cutter 43 is configured to cut the material coil 10 conveyed through the feeding rollers 41 by a preset length.

The cutter 43 is given driving torque by a third motor M3 to cut the material coil 10.

In addition, the cutter 43 is connected to a connection plate 47 mounted through a third LM guide LM3 in the fourth frame F4 and is given driving torque by a fifth motor M5 to change a position in forward and backward direction along the third LM guide LM3.

In other words, the material coil 10 may be cut by the preset length as the position of the cutter 43 may be changed along a supply direction of the material coil 10.

The reference number 45 in FIG. 4 identifies a cable guide for packaging various cables in accordance with an embodiment of the present disclosure.

Thus, the material coil 10 may be cut to required length, which varies according to the specifications of the hairpin 7 to be formed.

The material coil 10 that has passed the feeding unit 40 is supplied to the forming unit 50 and loaded into the position where the hairpin 7 is to be formed.

Figure 5:
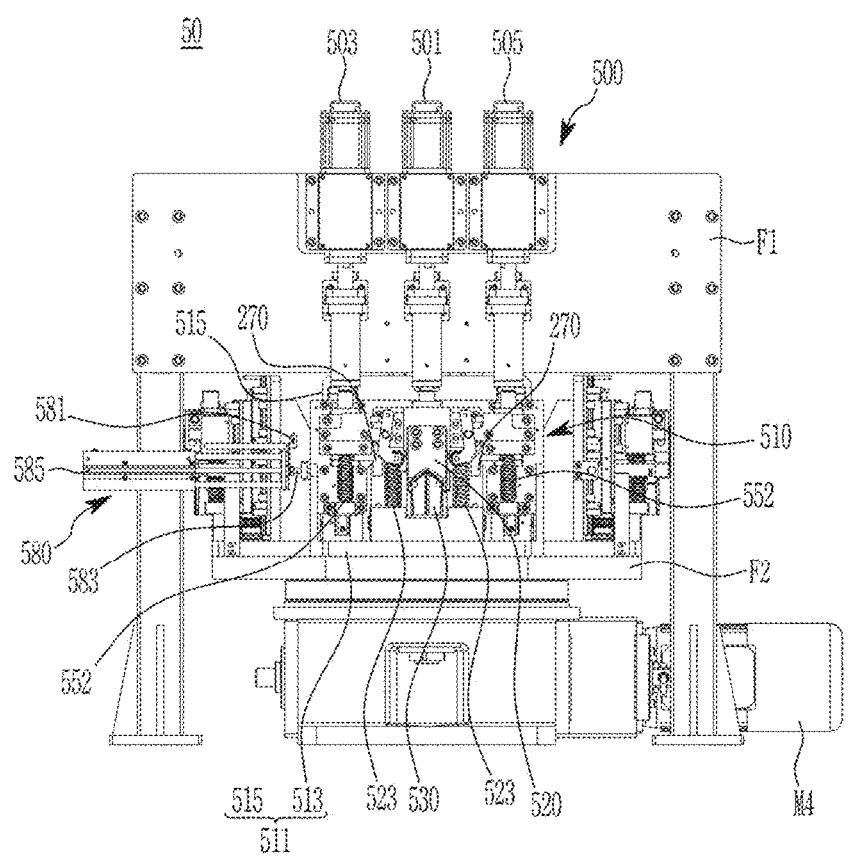
FIG. 5 and FIG. 6 are, respectively, a schematic diagram of a forming unit applied to a system for forming a hairpin according to an embodiment.
Figure 6:
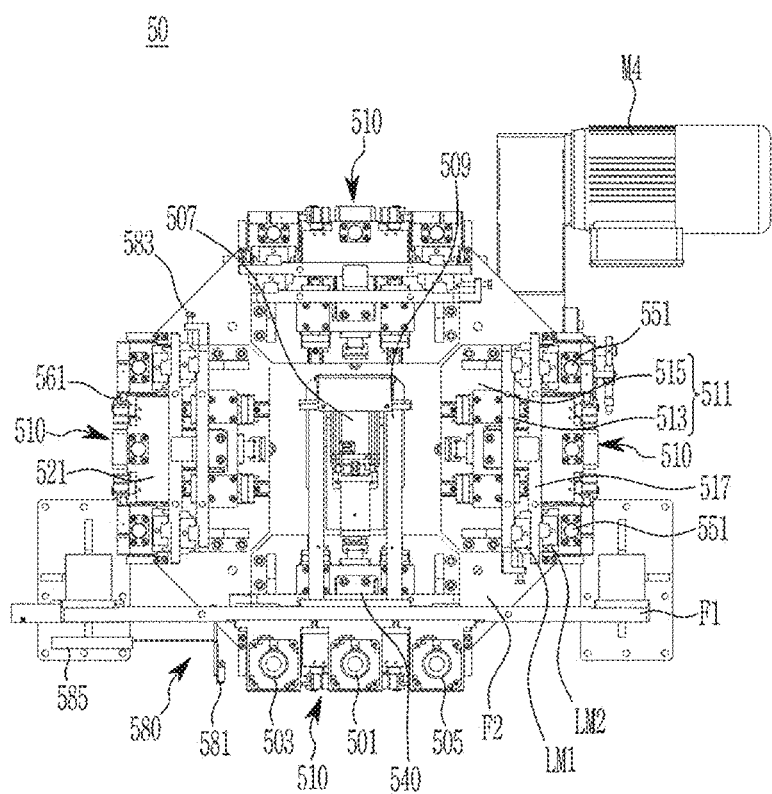
Figure 7:
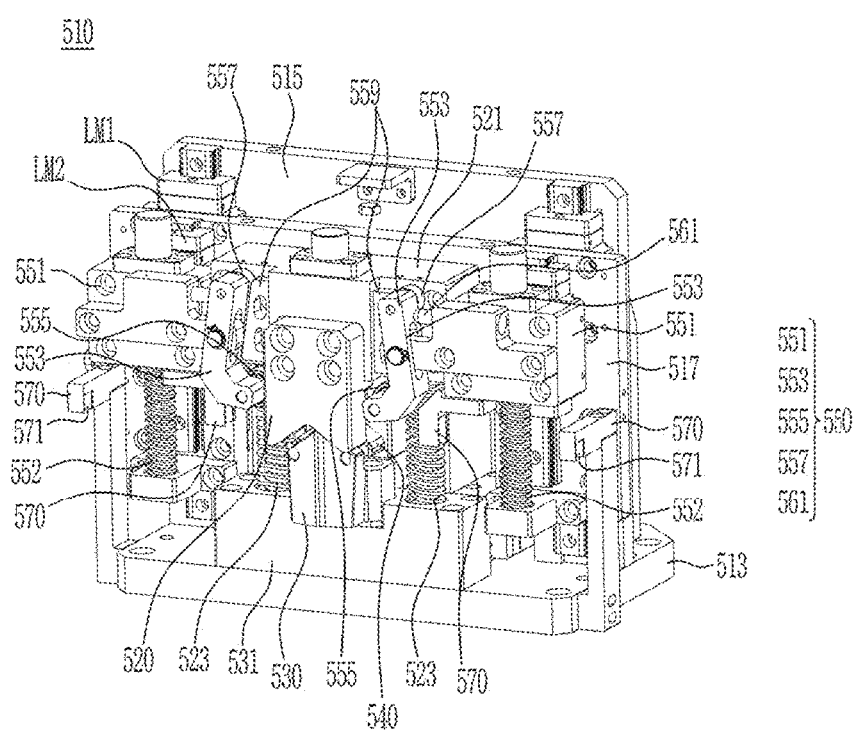
FIG. 7 is a schematic diagram of a mold device applied to a system for forming a hairpin according to an embodiment.

FIG. 5 and FIG. 6 are, respectively, a schematic diagram of a forming unit applied to a system for forming a hairpin according to an embodiment. FIG. 7 is a schematic diagram of a mold device applied to a system for forming a hairpin according to an embodiment.

Referring to FIG. 5 and FIG. 6, in an embodiment, the forming unit 50 includes a driving device 500, a mold device 510, and a sensing device 580.

The driving device 500 is installed on a first frame F1 at a forming position where the material coil 10 is to be formed.

The driving device 500 includes first to fourth servo-motors 501, 503, 505, and 507. The first to third servo-motors 501, 503, and 505 are configured to vertically operate, i.e., disposed to drive their drive shafts in the vertical direction. The fourth servo-motor 507 is configured to horizontally operate, i.e., disposed to drive its drive shaft in the horizontal direction.

Here, the fourth servo-motor 507 may be mounted to the first frame F1 through a separate connection bracket 509.

The mold device 510 is disposed adjacent to a lower portion of the first frame F1 and is installed to a second frame F2 rotated by a fourth motor M4.

A plurality of such mold devices 510 are provided on an upper surface of the second frame F2 at a preset interval.

For example, four mold devices 510 may be provided at four positions facing four different directions along the circumference of the first frame F1. Different types of forming blocks 520, 530, and 540, described in further detail below, may be provided to respective mold devices 510 to provide capability of handling different types of hairpins.

The second frame F2 is configured to rotate by 90° by the fourth motor M4, thereby to position a corresponding mold device 510 to the forming position of the material coil 10.

Figure 8:
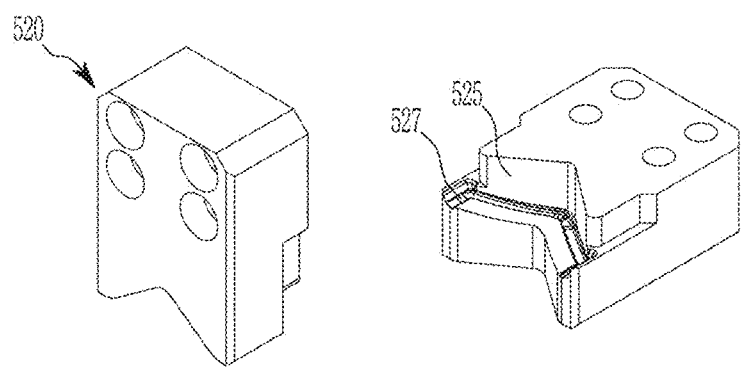
FIG. 8 is a schematic diagram of a forming blocks applied to a system for forming a hairpin according to an embodiment.
Figure 8:
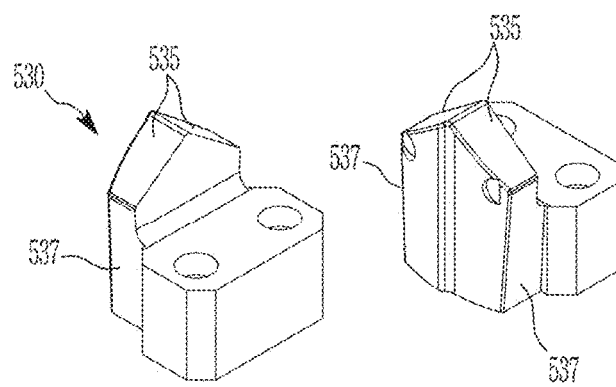
Figure 8:
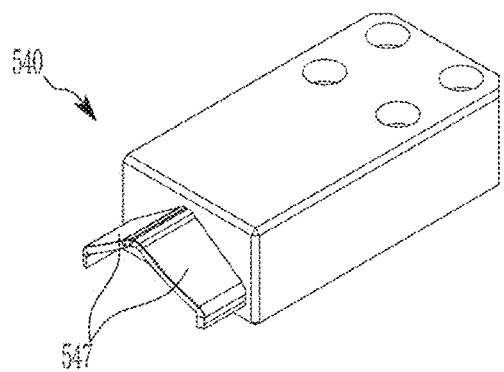

Referring to FIG. 6, FIG. 7, and FIG. 8, the mold device 510 is installed on a mold frame 511. The mold frame 511 includes a bottom plate 513 and a vertical plate 515 formed vertical to the bottom plate 513. The mold frame 511 is detachably installed on the upper surface of the first frame F1.

A connection plate 517 is installed on the vertical plate 515 through a first LM guide LM1 so as to be slidable along the vertical direction.

In addition, a plurality of forming blocks 520, 530, and 540 are disposed at a horizontally central portion of the connection plate 517. A pair of forming roller units 550 are mounted on the connection plate 517 at both sides based on the forming blocks 520, 530, and 540.

First, the forming blocks may include first to third forming blocks 520, 530, and 540. The first forming block 520 is mounted on the connection plate 517 through an engagement bracket 521. The first forming block 520 is connected to the first servo-motor 501 and may vertically move along the first LM guide LM1 together with the connection plate 517 by the operation of the first servo-motor 501.

At this time, a first spring 523 is mounted on both sides at a lower portion of the engagement bracket 521. The first forming block 520 is elastically supported by the first spring 523.

The first forming block 520 is formed with an upper forming surface 525 and a forming groove 527 at a bottom side that is to contact the material coil 10 and adjacent to the connection plate 517.

In other words, a lower side surface of the first forming block 520 that is to contact the upper portion of the material coil 10 is formed as the upper forming surface 525 in a shape of recess that is concave upward.

In addition, the forming groove 527 is formed on a surface of the first forming block 520 that is stepped with respect to the upper forming surface 525 and connected to the upper forming surface 525.

In other words, the first forming block 520 is disposed at a position corresponding to a central portion of the material coil 10 and configured to form the head portion 7a by the upper forming surface 525 and the forming groove 527 by moving down by the first servo-motor 501 and moving up by a first spring 523 connected to the engagement bracket.

The forming groove 527 may be formed to set an angle between the head portion 7a in a curved shape and the leg portion 7b of the hairpin 7.

The second forming block 530 is disposed at a lower side of the first forming block 520 and is mounted on the bottom plate 513 through a fixing bracket 531.

A lower forming surface 535 corresponding to the upper forming surface 525 of the first forming block 520 is formed convexly upward on an upper surface of the second forming block 530.

The upper forming surface 525 and the lower forming surface 535 may be combined to form the curved shape of the head portion 7a of the hairpin 7.

In addition, the second forming block 530 includes side surfaces each of which is formed as a slanted surface 537 and connected to the lower forming surface 535.

The third forming block 540 is connected to the fourth servo-motor 507 and is operable in the horizontal direction by the fourth servo-motor 507. The third forming block includes a forming protrusion 547 interposed between the first forming block 520 and the second forming block 530.

The fourth servo-motor 507 is mounted to the first frame F1 through the connection bracket 509.

At this time, the forming protrusion 547 is formed in a shape corresponding to the forming groove 527 of the first forming block 520.

In other words, the forming protrusion 547 is formed in a shape corresponding to the curved shape of the head portion 7a and the bent region of the leg portions 7b of the hairpin 7.

After the material coil 10 is primarily forming-processed through the upper forming surface 525 and the lower forming surface 535, the forming protrusion 547 is inserted into a gap between the upper forming surface 525 and the lower forming surface 535 to secondary process form the material coil 10.

Multiple types of the hairpins 7 may be formed by altering the shapes of the upper forming surface 525, the forming groove 527, the lower forming surface 535, and the forming protrusion 547 of the first to third forming blocks 520, 530, and 540.

Meanwhile, the pair of forming roller units 550 are disposed to both sides of the first to third forming blocks 520, 530, and 540.

The pair of forming roller units 550 are formed in a same configuration. Thus, only one forming roller unit 550 is hereinafter described in detail.

The forming roller unit 550 includes a mounting bracket 551 that is mounted on the connection plate 517 through a second LM guide LM2.

At this time, the mounting bracket 551 is elastically supported by a second spring 552 mounted below the mounting bracket 551 and is connected to a second servo-motor 503 or a third servo-motor 505 disposed above (refer to FIG. 5).

A rotation link 553 is hinged-engaged to the mounting bracket 551.

A lower roller 555 is mounted on the lower end portion of the rotation link 553 and an upper roller 557 is mounted on the upper end portion of the rotation link 553.

The lower roller 555 is to form the leg portion 7b by pressurizing the material coil 10 against the second forming block 530 while descending along the slanted surface 537 of the second forming block 530.

In addition, the upper roller 557 is to pressurize the lower roller 555 toward the second forming block 530 by the principle of a lever while descending along the guide plate 559 mounted on both sides of the engagement bracket 521.

Figure 10:
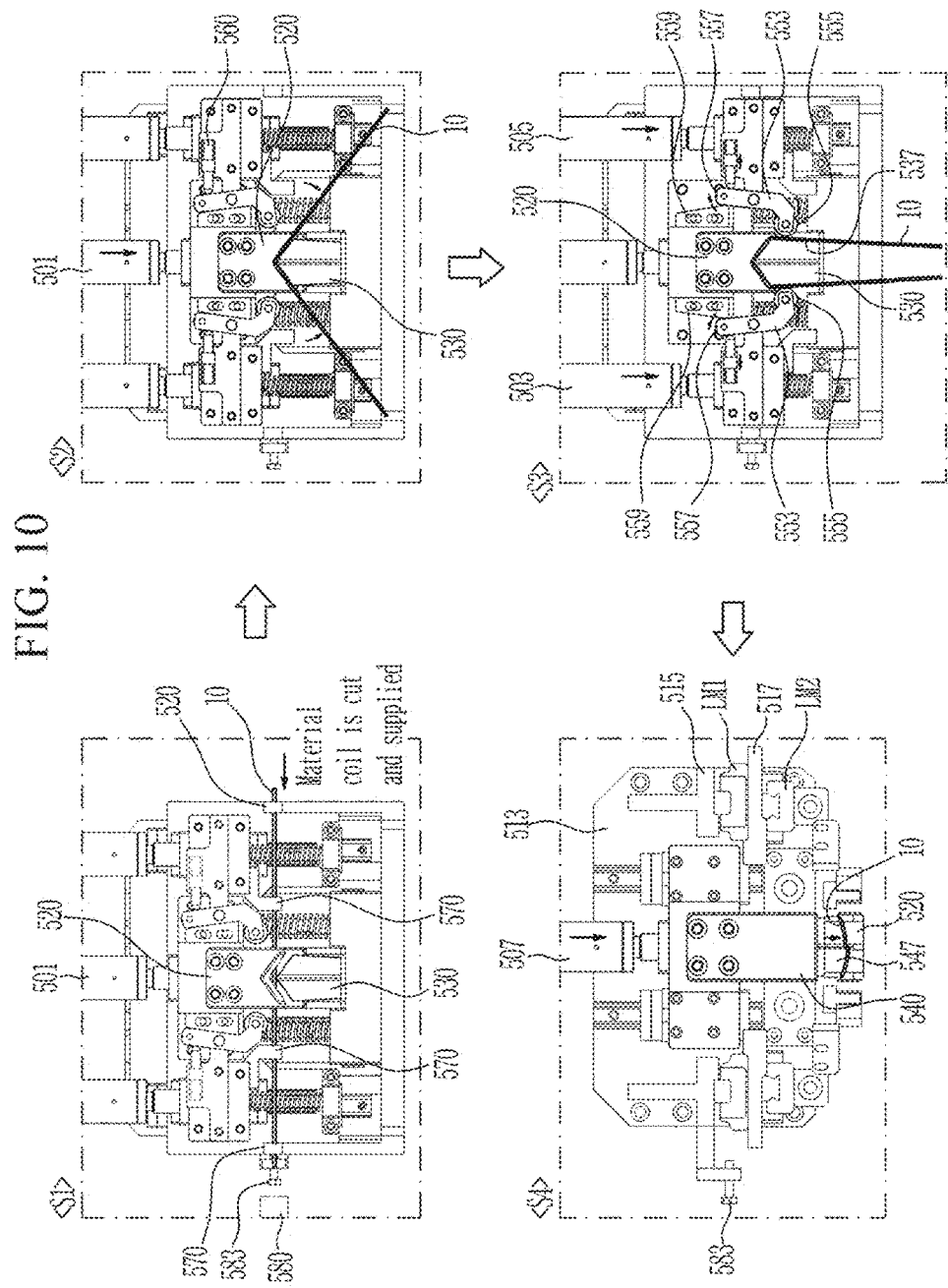
FIG. 10 and FIG. 11 are, respectively, a flowchart showing a method for forming a hairpin according to an embodiment.

At this time, the mounting bracket 551 is mounted with a pressurizing bar 561 (refer to FIG. 6) through a third spring 560 (refer to FIG. 10). The pressurizing bar 561 is configured to push the upper roller 557 by the elastic force of the third spring 561.

The pair of forming roller units 550 are respectively connected to the second servo-motor 503 and the third servo-motor 505 through the mounting brackets 551. While being operated to descend by the operation of the second servo-motor 503 and the third servo-motor 505, upper portions of the rotation links 553 are driven outward.

At this time, while the upper roller 557 moves along the guide plate 559, the lower roller 555 is pressurized toward the slanted surface 537 of the second forming block 530.

In addition, the mold device 510 is mounted with a plurality of clampers 570, which are disposed along the horizontal direction at positions to process the material coil 10.

At this time, the clamper 570 is formed with an opening 571 at a lower side and configured to position the material coil 10 while holding the material coil 10 inserted through the opening 571.

Each of the plurality of mold devices 510 mounted on the second frame F2 may be provided with a corresponding one of the first to third forming blocks 520, 530, and 540 (refer to FIG. 8), and configured to rotate the second frame F2 to load the mold device 510 to form the forming position depending on the hairpin 7 to be formed, thereby enabling production of multiple types of hairpins.

Referring to FIG. 6, in an embodiment, the sensing device 580 is disposed behind the clamper 570 based on the supply direction of the material coil 10.

The sensing device 580 senses the position of the material coil 10 to determine whether the material coil 10 is positioned to the home position.

The sensing device 580 includes a beam sensor 581 for sensing the material coil 10, a stopper 583 disposed at a preset position of the mold device 510 depending on the type of the hairpin 7, and a sensor driving portion 585 mounted on the first frame F1 and configured to position the beam sensor 581 by using the stopper 583.

Tin other words, the stopper 583 of the sensing device 580 is set differently for each type of the hairpin 7 to be formed and is configured to position the supplied material coil 10 because the sensor driving portion 585 moves the beam sensor 581 by the stopper 583.

Figure 9:
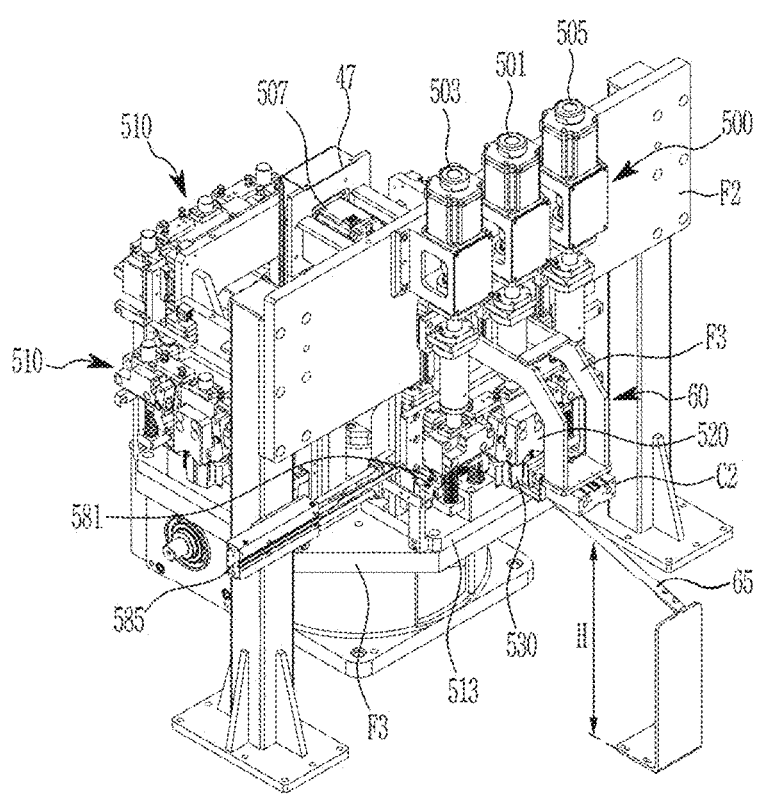
FIG. 9 is a schematic diagram of a transfer unit applied to a system for forming a hairpin according to an embodiment.

FIG. 9 is a schematic diagram of a transfer unit applied to a system for forming a hairpin according to an embodiment.

Referring to FIG. 9, in an embodiment, the transfer unit 60 is configured to load the hairpin 7, which has been formed by the forming unit 50, on a separate guide rail 65.

The transfer unit 60 is mounted on a third frame F3, which is connected to the first frame F1.

Specifically, the transfer unit 60 is mounded on the third frame F3 at a position corresponding to a corresponding one of the plurality of forming blocks 520, 530, and 540, and includes a second cylinder C2 configured to move back and forth with respect to the completed hairpin 7.

A plurality of guide pins 63 (refer to FIG. 11) are mounted on the second cylinder C2.

The guide pin 63 removes the completed hairpin 7 from the forming unit 50 and guides it to the guide rail 65.

The guide rail 65 may be disposed obliquely such that the height h from the second base frame 103 decreases as the distance from the forming unit 50 increases.

Thus, the hairpin 7 may be automatically loaded along the inclined guide rail 65.

A method of forming the hairpin 7 using the system 100 for forming a hairpin is as follows.

Figure 11:
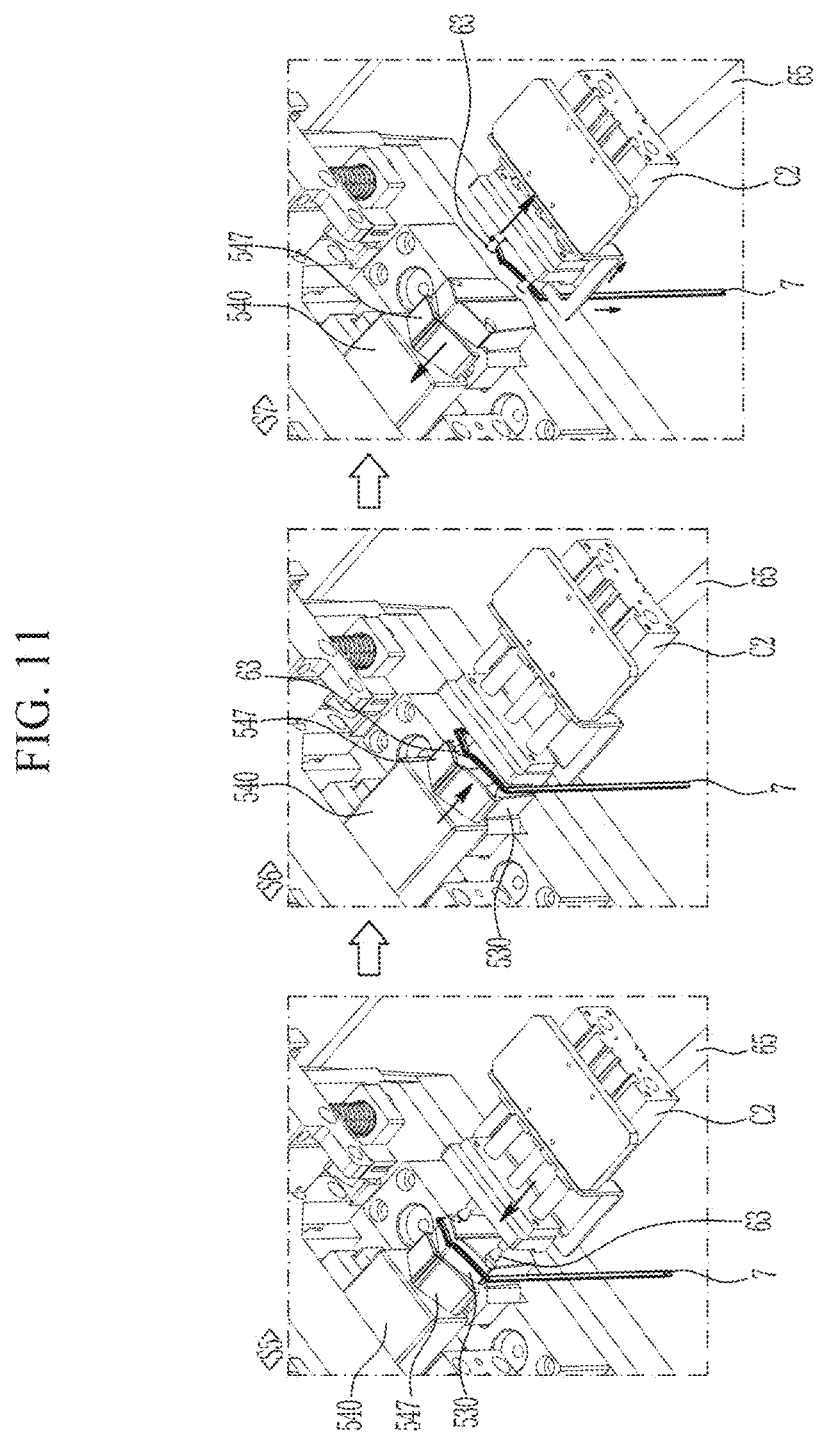

FIG. 10 and FIG. 11 are, respectively, a flowchart showing a method for forming a hairpin according to an embodiment.

FIG. 10 illustrates from the step in which the material coil is cut to a preset length and is supplied from the feeding unit to the forming unit.

First, as shown in FIG. 3, the bobbin 11 wound with the material coil 10 is loaded in the bobbin loading portion 21 of the unwinder unit 20.

While the first motor M1 connected to the bobbin loading portion 21 is operated to rotate the bobbin 11, the unwinder roller 23 contacts the material coil 10 to release strands of the material coil 10.

At this time, the material coil 10 may be supplied to the supply portion 29 while being guided by the plurality of guide bars 27 disposed outside of the bobbin loading portion 21.

The supply portion 29 is configured to supply the unwound material coil 10 to the flattening roller 30.

The material coil 10 unwound from the unwinder unit 20 is supplied to the flattening roller 30.

A straightness is given to the material coil 10 through the plurality of flattening rollers 30.

Next, the material coil 10 is supplied to the feeding unit 40 shown in FIG. 4.

The feeding unit 40 is configured to cut the material coil 10 to a preset length, where the preset length may depend on the specification of the hairpin 7.

For such a purpose, the material coil 10 is transferred to the cutter 43 through the plurality of feeding rollers 41. The material coil 10 passing through the cutter 43 is cut to the preset length by controlling the horizontal position of the cutter 43, i.e., the position along the supply direction of the material coil 10.

Referring to FIG. 10, at step S1, the material coil 10 having passed through the feeding unit 40 is loaded to the position to be molded by the clamper 570.

Meanwhile, the mold device 510 corresponding to the specifications of the hairpin 7 to be formed is positioned to a home position.

First, the second frame F2 is rotated such that the mold device 510 is connected to the driving device 500.

When the mold device 510 is connected to the driving device 500, the material coil 10 is loaded by the clamper 570.

At this time, the home positioning of the material coil 10 may be detected by the sensing device 580.

Since the material coil 10 is a thin and lengthy coil of copper material, which has good bending property, the material coil 10 is supported by the clamper 570. Whether the material coil 10 is correctly loaded is checked by the sensing device 580.

While a central portion of the material coil 10 is supported by the first forming block 520 and the second forming block 530, the material coil 10 is supported by the clamper 570 at a plurality of points along the length direction.

At step S2, while the material coil 10 is supplied between the first forming block 520 and the second forming block 530, the first servo-motor 501 of the driving device 500 is operated to lower the first forming block 520.

The head portion 7a is primarily formed by the upper forming surface 525 of the first forming block 520 and the lower forming surface 535 of the second forming block 530.

At step S3, while the material coil 10 is interposed between the first forming block 520 and the second forming block 530, the second and third servo motors 503 and 505 are operated to lower the pair of forming roller units 550 (i.e., the rotation link 553, the lower roller 555, and the upper roller 557 as shown) to form the leg portion 7b.

At this time, a spring back effect due to the characteristic of the material coil 10 may generally occur. Therefore, and to compensate for such effect, the portions to be the leg portions 7b may be bent more than an angle required to make the leg portions 7b to be apparently parallel. For this reason, the slanted surface 537 of the second forming block 530 is employed.

Subsequently, the first forming block 520 is raised by a preset distance to form a gap between the first forming block 520 and the second forming block 530.

At this time, at step S4, the fourth servo-motor 507 is operated to insert the forming protrusion 547 of the third forming block 540 into the gap.

The secondary forming of the head portion 7a is performed as the material coil 10 seated on the upper surface of the second forming block 530 is pushed by the forming protrusion 547 and inserted into the forming groove 527 of the first forming block 520.

Then, the hairpin 7, of which the forming is completed, is seated on the second forming block 530.

Finally, referring to FIG. 11, the hairpin 7 is removed from the forming unit 50 and loaded on the separate guide rail 65.

For such a purpose, at step S5, the second cylinder C2 is operated to move the guide pin 63 toward the second forming block 530 such that the guide pin 63 contacts the second forming block 530.

At step S6, the fourth servo-motor 507 is operated to move the third forming block 540 to push the hairpin 7 toward the guide pin 63 by the forming protrusion 547.

At step S7, as the second cylinder C2 returns, the hairpin 7 across the guide pin 63 falls down and is caught on the guide rail 65 disposed under the second cylinder C2.

The hairpin 7 is automatically loaded by the guide rail 65 that is arranged in a slanted way.

Therefore, according to a system and method for forming a hairpin according to an embodiment, since the mold device may be automatically changed depending on the types of the hairpin to be formed, multiple types of hairpins may be formed by a single equipment. Equipment investment cost and an area occupied by the equipment are thereby reduced.

In addition, according to a system and method for forming a hairpin according to an embodiment, in comparison with a conventional CNC forming method or press-mold method, the forming method is simplified, the forming time may be shortened, and productivity may be improved.

While this disclosure has been described in connection with several embodiments, it is to be understood that the disclosure is not limited to the disclosed embodiments. On the contrary, this disclosure is intended to cover various modifications and equivalent arrangements included within the spirit and scope of the appended claims.

DESCRIPTION OF SYMBOLS

| | |
|---|---|
| 1: stator | 3: stator core |
| 5: slot | 7: hairpin |
| 7a: head portion | 7b: leg portion |
| 10: material coil | 11: bobbin |
| 100: system for forming hairpin | 101: first base frame |
| 103: second base frame | 20: unwinder unit |
| 21: bobbin loading portion | 23: unwinder roller |
| 25: link arm | 27: guide bar |
| 29: supply portion | 30: flattening roller |
| 40: feeding unit | 41: feeding roller |
| 43: cutter | 45: cable guide |
| 47: connection plate | 50: forming unit |
| 500: driving device | 501: first servo-motor |
| 503: second servo-motor | 505: third servo-motor |
| 507: fourth servo-motor | 509: connection bracket |
| 510: mold device | 511: mold frame |
| 513: bottom plate | 515: vertical plate |
| 517: connection plate | 520: first forming block |
| 521: engagement bracket | 523: first spring |
| 525: upper forming surface | 527: forming groove |
| 530: second forming block | 531: fixing bracket |
| 535: lower forming surface | 537: slanted surface |
| 540: third forming block | 547: forming protrusion |
| 550: forming roller unit | 551: mounting bracket |
| 552: second spring | 553: rotation link |
| 555: lower roller | 557: upper roller |
| 559: guide plate | 560: third spring |
| 561: pressurizing bar | 570: clamper |
| 571: opening | 580: sensing device |
| 581: beam sensor | 583: stopper |
| 585: sensor driving portion | 60: transfer unit |
| 63: guide pin | 65: guide rail |

What is claimed is:

1. A system for forming a head portion and a leg portion of a hairpin applied to a hairpin type drive motor, the system comprising:
   an unwinder unit configured to unwind a material coil wound around a bobbin and to flatten the material coil by a plurality of flattening rollers;
   a feeding unit configured to receive the material coil from the unwinder unit and to cut the received material coil to a preset length; and
   a forming unit including a mold device having a plurality of forming blocks and a pair of forming roller units,
   wherein the plurality of forming blocks are configured to process the material coil supplied from the feeding unit,
   wherein the forming unit is configured to form the material coil by the plurality of forming blocks and the pair of forming roller units through a driving device connected to the mold device,
   wherein the driving device includes first, second, third, and fourth servo-motors mounted on a first frame,
   wherein the first, second, and third servo-motors are configured to vertically operate and the fourth servo-motor is configured to horizontally operate,
   wherein the mold device includes a first forming block configured to vertically operate by the first servo-motor, a second forming block configured to primarily form the head portion by being combined with the first forming block, and a third forming block configured to horizontally operate by the fourth servo-motor to secondarily form the head portion by being combined with the first forming block, and
   wherein the mold device is provided in a plural quantity through a second frame rotatable with respect to the first frame.

2. The system of claim 1, wherein the unwinder unit comprises:
   a bobbin loading portion configured to load the bobbin and to rotate by a motor;
   an unwinder roller that is connected to the bobbin loading portion through a link arm operated by a first cylinder, the unwinder roller movable by the link arm and the first cylinder to contact the material coil and configured to unwind the material coil;
   a plurality of guide bars disposed at respective corners of the bobbin loading portion and configured to guide the material coil unwound from the bobbin; and
   a plurality of flattening rollers configured to flatten the material coil supplied from the unwinder roller.

3. The system of claim 1, wherein the feeding unit comprises:
   a plurality of feeding rollers configured to transfer the material coil supplied from the unwinder unit; and
   a cutter configured to cut the material coil to a preset length while changing a position along a supply direction of the material coil.

4. The system of claim 1, wherein:
   the mold device further comprises a plurality of clampers disposed along a horizontal direction to position the material coil to a preset position;
   the first forming block is disposed at a position corresponding to a central portion of the material coil and is configured to form the head portion by an upper forming surface and a forming groove by moving down by the first servo-motor and moving up by a first spring connected to an engagement bracket;
   the second forming block is disposed at a lower side of the first forming block and includes a lower forming surface corresponding to the upper forming surface;
   the third forming block comprises a forming protrusion configured to push the primarily formed head portion toward the forming groove of the first forming block; and
   the pair of forming roller units are disposed adjacent to both sides of the first, second, and third forming blocks and are configured to form the leg portion while moving along both slanted surfaces of the second forming block.

5. The system of claim 4, wherein the clamper is formed with an opening to receive and hold the material coil.

6. The system of claim 4, wherein the first forming block comprises:
   an upper forming surface, formed as a recess that is concave upward, at a lower side surface of the first forming block; and
   a forming groove, formed on a surface of the first forming block that is stepped with respect to the upper forming surface, connected to the upper forming surface, and formed to set an angle between the head portion and the leg portion of the hairpin.

7. The system of claim 6, wherein the second forming block comprises:
   an upper surface forming a lower forming surface that is formed convexly upward; and
   side surfaces, each of which is formed as a slanted surface and connected to the lower forming surface.

8. The system of claim 6, wherein the third forming block comprises a forming protrusion protruding in a shape corresponding to a curved shape of the head portion and a bent region of the leg portion.

9. The system of claim 6, wherein each of the pair of forming roller units comprises:
   a mounting bracket disposed at either side of the first, second, and third forming blocks, elastically supported by a second spring, and connected to either of the second servo-motor and the third servo-motor;
   a rotation link hinge-engaged with the mounting bracket;
   a lower roller mounted on a lower portion of the rotation link and configured to form the leg portion by pressurizing the material coil against the second forming block while descending along a side surface of the second forming block;
   an upper roller mounted on an upper portion of the rotation link and configured to pressurize the lower roller toward the second forming block through a lever while descending along a guide plate mounted on the engagement bracket; and
   a pressurizing bar mounted on the mounting bracket through a third spring and configured to push the upper roller by the elastic force of the third spring.

10. The system of claim 4, wherein the forming unit further comprises a sensing device disposed behind the clamper based on a supply direction of the material coil and configured to sense a position of the material coil, and wherein the sensing device comprises:
    a beam sensor configured to sense the material coil;
    a stopper disposed at a preset position of the mold device depending on a type of the hairpin; and
    a sensor driving portion mounted on the first frame and configured to position the beam sensor by using the stopper.

11. The system of claim 1, further comprising a transfer unit disposed at a position corresponding to a plurality of forming blocks and configured to remove the hairpin from the forming unit by a guide pin and load the hairpin on a guide rail while moving back and forth with respect to the formed hairpin.

12. A system for forming a head portion and a leg portion of a hairpin applied to a hairpin type drive motor, the system comprising:
- an unwinder unit configured to unwind a material coil wound around a bobbin and to flatten the material coil by a plurality of flattening rollers;
- a feeding unit configured to receive the material coil from the unwinder unit and to cut the received material coil to a preset length; and
- a forming unit including a mold device having a plurality of forming blocks and a pair of forming roller units,
- wherein the plurality of forming blocks are configured to process the material coil supplied from the feeding unit,
- wherein the forming unit is configured to form the material coil by the plurality of forming blocks and the pair of forming roller units through a driving device connected to the mold device, and
- wherein the unwinder unit includes
  - a bobbin loading portion configured to load the bobbin and to rotate by a motor,
  - an unwinder roller that is connected to the bobbin loading portion through a link arm operated by a first cylinder, the unwinder roller movable by the link arm and the first cylinder to contact the material coil and configured to unwind the material coil,
  - a plurality of guide bars disposed at respective corners of the bobbin loading portion and configured to guide the material coil unwound from the bobbin, and
  - a plurality of flattening rollers configured to flatten the material coil supplied from the unwinder roller.

13. A system for forming a head portion and a leg portion of a hairpin applied to a hairpin type drive motor, the system comprising:
- an unwinder unit configured to unwind a material coil wound around a bobbin and to flatten the material coil by a plurality of flattening rollers;
- a feeding unit configured to receive the material coil from the unwinder unit and to cut the received material coil to a preset length;
- a forming unit including a mold device having a plurality of forming blocks and a pair of forming roller units; and
- a transfer unit disposed at a position corresponding to a plurality of forming blocks and configured to remove the hairpin from the forming unit by a guide pin and load the hairpin on a guide rail while moving back and forth with respect to the formed hairpin,
- wherein the plurality of forming blocks are configured to process the material coil supplied from the feeding unit, and
- wherein the forming unit is configured to form the material coil by the plurality of forming blocks and the pair of forming roller units through a driving device connected to the mold device.

* * * * *